United States Patent

Ito et al.

[15] 3,661,548
[45] May 9, 1972

[54] APPARATUS FOR MANUFACTURING GLASS RIBBON BY FLOAT PROCESS

[72] Inventors: Kunihiko Ito; Yokiya Fujimoto; Nobuyoshi Ohsato; Naotomo Akashi, all of Maizuru, Japan

[73] Assignee: Nippon Sheet Glass Co., Ltd., Higashi-ku, Osaka, Japan

[22] Filed: June 26, 1970

[21] Appl. No.: 50,143

[30] Foreign Application Priority Data

June 30, 1969 Japan..................................44/52059
June 30, 1969 Japan..................................44/52060
Aug. 25, 1969 Japan..................................44/68233

[52] U.S. Cl..................................65/182 R, 65/91, 65/99 A, 65/199
[51] Int. Cl. .......................................................C03b 18/00
[58] Field of Search................65/25, 25 A, 91, 99 A, 182 R, 65/199

[56] References Cited

UNITED STATES PATENTS

| | | | |
|---|---|---|---|
| 3,222,154 | 12/1965 | Pilkington | 65/91 |
| 3,493,359 | 2/1970 | Lawrenson | 65/182 R |
| 1,639,453 | 12/1924 | Ferngren | 65/199 |
| 3,250,604 | 5/1966 | Toytot | 65/182 R X |
| 3,468,652 | 9/1969 | Beck | 65/182 R X |
| 3,373,008 | 3/1968 | Lawrenson et al. | 65/182 R |
| 3,520,672 | 7/1970 | Greenler et al. | 65/182 R X |

Primary Examiner—S. Leon Bashore
Assistant Examiner—Robert L. Lindsay, Jr.
Attorney—Wenderoth, Lind & Ponack

[57] ABSTRACT

An apparatus for manufacturing glass ribbon by float process. The apparatus comprises a molten metal bath, at least two width-controlling mechanisms provided on both sides of the bath, and a delivery roll provided on exit side of the bath. Each width-controlling mechanism has a rotary member having a plurality of projections capable of freely rotating with the advance of the glass ribbon. And an angle of less than 45° is formed by the plain containing the rotary member with respect to the direction of advance of the glass ribbon.

11 Claims, 24 Drawing Figures

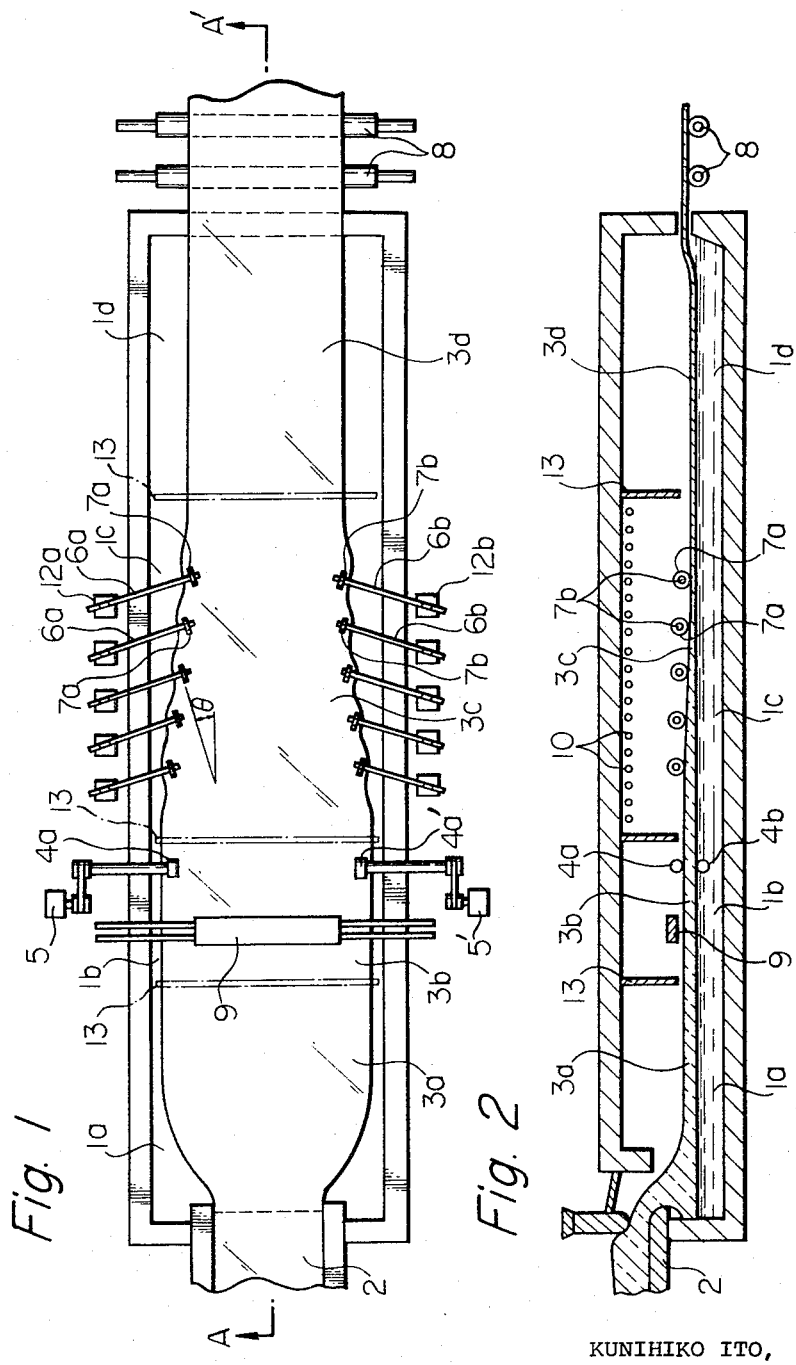

KUNIHIKO ITO,
YUKIYA FUJIMOTO,
NOBUYOSHI OHSATO &
NAOTOMO AKASHI,
INVENTORS

APPARATUS FOR MANUFACTURING GLASS RIBBON BY FLOAT PROCESS

This invention relates to an apparatus for the manufacture of glass ribbon. More particularly, the invention relates to an apparatus in use for manufacturing glass ribbon by flowing molten glass over a bath of molten metal, advancing the molten glass over the molten metal and coveying the cooled and solidified glass ribbon by conveying rolls located downstream of the exit of the bath.

In manufacturing glass ribbon continuously by feeding molten glass at a prescribed rate onto a bath of molten metal and advancing the molten glass in the form of ribbon over the molten metal bath at a fixed rate, the product glass ribbon is allowed to have a certain equilibrium thickness determined by factors such as the temperature of the molten glass feed, the speed of advance of the glass and other conditions. Under normal operational conditions this equilibrium thickness is about 6.8 mm. Glass of a thickness different from the equilibrium thickness may be formed by adjusting the temperature of the glass ribbon on the molten metal bath and the above-mentioned delivery rate of the conveyor rolls. However, there is a limit to the adjustment of the glass ribbon temperature and the delivery rate, because it is impossible to obtain a glass ribbon of a sufficient width under normal operation conditions when such adjustment is conducted beyond a certain range. Accordingly, it is difficult to produce a glass ribbon having a thickness greatly different from the equilibrium thickness by adjusting only the temperature of the glass ribbon on the molten metal bath and the delivery rate of conveying rolls.

As the apparatus for the manufacture of glass of less than equilibrium thickness, in the specification of British Pat. No. 1,085,010 there is proposed an apparatus wherein the thickness of the glass ribbon is reduced by laterally stretching the glass ribbon which is advancing over the molten metal bath and is still in the plasticized state, by means of a series of rolls provided above each marginal edge of the glass ribbon along the direction of the advance of the glass ribbon, said rolls being rotated by a driving member with the rotation axes inclined to the perpendicular to the longitudinal axis of the glass ribbon and said rolls being caused to engage the surface of the glass ribbon. However, this apparatus is defective in that since each of the rolls is rotated at the same speed, although the speed of the advancing glass ribbon is somewhat different at points where the glass ribbon contacts each of the rolls provided along the direction of the advance of the glass ribbon, the glass undergoes an external force which is non-uniform in the lateral direction and hence the thickness of the glass ribbon is non-uniform in the lateral direction. Further, this apparatus is disadvantageous in that the apparatus necessitates provision of complicated means for transmission of power and adjustment of the speed.

Another apparatus for the manufacture of glass ribbon of less than equilibrium thickness is proposed in Japanese Pat. Publication No. 9262/64. According to this proposal, the thickness of the glass ribbon is reduced by stretching the glass ribbon by conveying rolls while the glass ribbon is gripped by pairs of upper and lower rolls which are driven by means of a driving member and disposed along each marginal edge of the glass ribbon advancing on the bath in a manner such that they may be rotated in the direction the same as the direction of advance of the glass ribbon. This prior art teaches provision of at least a pair of upper and lower auxiliary rolls along each side edge of the glass ribbon in the cooling zone which may be free-running or may be driven by a driving member and the axes of the rotation of which are inclined to the direction of travel of the glass ribbon, and discloses that the width of the glass ribbon is regulated and controlled by gripping both edges of the glass ribbon by said auxiliary rolls.

However, this apparatus provided with the auxiliary rolls has the following defects:

1. Since the auxiliary rolls are mounted so as to grip the glass ribbon, when they are disposed at a relatively high temperature zone, they tend to adhere to the glass ribbon and, when they are located at a relatively low temperature zone, their action of expanding the width of the glass ribbon is weak and unnatural force is given to the glass ribbon, resulting in unevenness of the thickness of the glass ribbon with respect to the lateral direction.

2. When the auxiliary rolls are driven and rotated by means of a driving member, it is difficult to accord the rotating rate of the auxiliary rolls with the speed of travel of the glass ribbon, and when they are allowed to rotate in a free-running manner, the uniform travel of the glass ribbon is prevented by an increased resistance caused by the rotation of the rolls gripping the glass ribbon, with the result that the thickness of the glass ribbon is made non-uniform in the lateral direction.

3. Since the molten metal is cooled by the lower roll immersed in the molten metal, undesirable flows of the molten metal are caused to occur in the bath.

4. Complicated means are required for adjusting the pressing force of the upper and lower rolls.

Most of the conventional apparatuses for manufacturing glass ribbon of greater than equilibrium thickness comprise width-controlling means provided along both side edges of the glass ribbon to restrict the free expansion of the glass ribbon on the molten metal bath, and many attempts have been made to avoid the phenomenon that the uniform travel of the glass ribbon is prevented by such width-controlling means. If this avoidance is not completely accomplished, the thickness of the resulting glass ribbon is not uniform with respect to the lateral direction.

The primary object of this invention is to provide an improved apparatus for manufacturing glass ribbon which is free of the above-mentioned defects of the conventional apparatuses.

In accordance with this invention there is provided an improvement of the apparatus for manufacturing glass ribbon by the float process which comprises a bath of molten metal for supporting molten glass ribbon fed from a molten glass inlet and forwarding it while cooling it, a mechanism for controlling the width of the glass ribbon having a shaft member and a rotary member provided on said shaft member, said rotary member having on the periphery thereof a plurality of projections engaging the side edges of the glass ribbon, and a delivery roll provided at the exit of the molten metal bath to convey the glass ribbon out of the bath; said improvement being characterized in that at least two width-controlling mechanisms are provided on both side edges of the molten metal bath spaced in the direction of travel of the glass ribbon only above the upper surface of the glass ribbon, the rotary member of each width-controlling mechanism being freely rotatably supported so that the rotary member may rotate with the advance of the glass ribbon, and that the line formed by the intersection of a plane perpendicular to the axis of the rotary member and the surface of the glass ribbon has an angle of less than 45° with respect to the direction of the advance of the glass ribbon.

In each of the width-controlling mechanisms of the apparatus of this invention, the rotary member capable of freely rotating around the axis of the rotary member is freely rotatable to such an extent that the flow of the glass ribbon in the direction of its advance will not be prevented by the rotation of the rotary member. If the line formed by the intersection of a plane perpendicular to the axis of the rotary member and the surface of the glass ribbon has an angle of greater than 45° with respect to the direction of the advance of the glass ribbon, the glass ribbon is abruptly stretched or contracted in the lateral direction of the glass ribbon, which results in occurrence of non-uniform thickness in the lateral direction and so-called distortion. Further, in such case, it is difficult for the rotary member to rotate with the advance of the glass ribbon and it cannot retain the function of holding the side edge of the glass ribbon. Accordingly, it is essential that the above-mentioned angle be less than 45°. If the above angle is less than about 5°, though the effect of positively stretching or contracting the glass ribbon in the lateral direction is low, the rotary member exhibits an action of preventing the glass ribbon from being stretched or contracted at the point where the glass ribbon would be stretched or contracted without provision of the rotary member. Thus, even if the above angle is less than about 5°, the rotary member exhibits an effect of relatively stretching or contracting the glass ribbon in the lateral direction. If the above angle is almost zero, there is substantially no tendency that the glass ribbon is contracted in the lateral direction.

It is not always necessary that the axis of the rotary member should be horizontal, and the axis may be inclined to some extent to the horizontal direction.

The rotary member capable of rotating around the shaft member may be provided on the shaft of a fixed type so as to rotate around it, or it is also permissible to construct the rotary member and the shaft member in one unitary assembly which can freely rotate on a bearing. In order to make the rotation of the rotary member smooth and increase the effect of stretching or contracting the width of the glass ribbon, in this invention it is desired to provide a rotary member of a greater diameter and a shaft member of a smaller diameter within ranges allowable in view of the mechanical strength and the operational limitation.

It is preferable that the rotary member be composed of a refractory material non-wettable to molten glass such as carbon or boron nitride. In case the rotary member is of the type freely rotating around a fixed shaft member, it is particularly advantageous to employ a rotary member composed of carbon, because the self-lubricating effect is attained while it rotates around the shaft member.

On the periphery of the rotary member there are provided a plurality of projections which have preferably a saw-tooth-like configuration with a tip angle of 5° – 90°. If the tip angle is smaller than 5°, since the projection of the rotary member sticks in the glass ribbon in the plasticized state too deeply, the rotary member easily adheres to the glass ribbon. If the tip angle is greater than 90°, the sticking of the projection into the surface portion of the glass ribbon is incomplete, and hence, the rotary member tends to slip on the surface of the glass ribbon. The preferable number of the projections sticking in the glass ribbon is one to 10.

In this invention, such rotary members are provided only above the upper surface of the glass ribbon along both side edges of the glass ribbon, and since they are allowed to rotate while being pressed onto the upper surface of the glass ribbon, hardly any external non-uniform force in the lateral direction is imparted by the resistance caused by the rotation of the rotary member. Accordingly, the thickness in the lateral direction is made uniform and stable. Further, since the rotary members of this invention may be located at a relatively high temperature zone, it is possible to increase the effect of stretching or contracting the width of the glass ribbon, with the result that the thickness in the lateral direction can be made more uniform.

In this invention, with a view to heightening the effect of stretching or contracting the width of the glass ribbon, a series of at least two width-controlling mechanisms provided with such rotary members are provided on both side edges of the molten metal bath spaced therealong in the direction of the travel of the glass ribbon. Generally, the speed of the advance of the glass ribbon gradually varies at the points where the width and thickness of the glass ribbon vary. Accordingly, when a series of rolls to be driven by a driving member are provided along the direction of the travel of the glass ribbon, in order to prevent the distortion of the glass ribbon in either lateral or longitudinal direction, it is necessary to change the speeds of these rolls suitably depending on the positions where they are provided. Accordingly, it is generally essential to provide means for adjusting the speeds of these rolls. In the apparatus of this invention, however, it is unnecessary to provide any means for adjusting speeds of the rotary members, although they are aligned along the direction of the travel of the glass ribbon, because they are allowed to rotate by the advance of the glass ribbon. Thus, in this invention the apparatus can be simplified. In this invention it is also possible to provide two or more series of groups of width-controlling mechanisms with a suitable distance between each two groups along the direction of the travel of the glass ribbon. It is not always essential that in each width-controlling mechanism the angle of the line formed by the intersection of a plane perpendicular to the axis of the rotary member and the surface of the glass ribbon with respect to the direction of the advance of the glass ribbon should be identical, and it is sometimes desirable that said angle be varied depending on the positions where the width-controlling mechanisms are located.

Still further, in accordance with this invention it is possible to produce optionally and easily glass ribbons of a thickness greater or smaller than the equilibrium thickness only by varying the positions of the width-controlling mechanisms, the number of the width-controlling mechanisms and the angle of the rotary member of the width-controlling mechanism while adjusting the amount of the molten glass fed to the molten metal bath, the rotation rate of the delivery roll and the temperature distribution in the molten metal bath.

In the apparatus of this invention, the width-controlling mechanism has no structure such as will grip the advancing glass ribbon, and no lower roll such as disclosed in above-mentioned Japanese Pat. Publication No. 9262/64 is provided in the width-controlling mechanism of this invention. Disadvantages caused by provision of the lower roll such as disorder in the flow of the molten metal and non-uniform temperature distribution in the molten metal bath are never encountered in this invention.

In order that the invention may be more clearly understood, reference will now be made to the accompanying drawings which show, by way of examples, some embodiments of the apparatus of this invention.

FIG. 1 is a plan view illustrating one embodiment of the apparatus of this invention where the structure of the roof of the molten metal bath is omitted.

FIG. 2 is a section taken along the line A – A' of FIG. 1, in which the roof structure of the molten metal bath is also shown.

Figure 9:
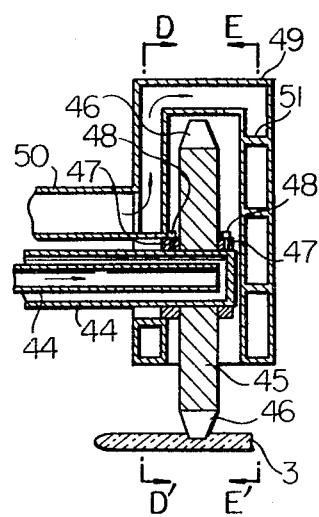
Figure 10:
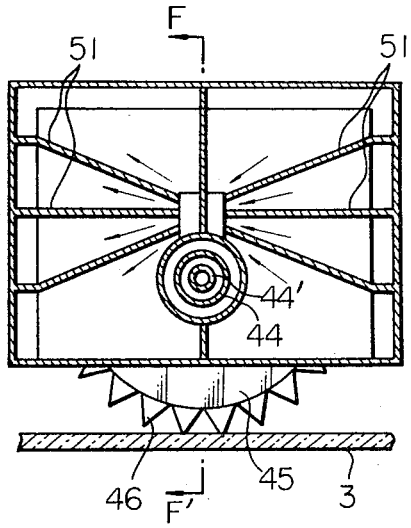
Figure 11:
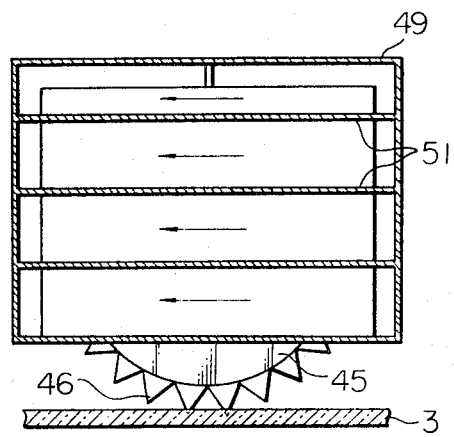

FIGS. 9, 10 and 11 are sectional views illustrating the width-controlling mechanism and the cooling box of the apparatus of this invention. FIG. 9 is a section taken along the line F – F' of FIG. 10. FIG. 10 is a section taken along the line D – D' of FIG. 9. FIG. 11 is a section taken along the line E – E' of FIG. 9.

Figure 12:
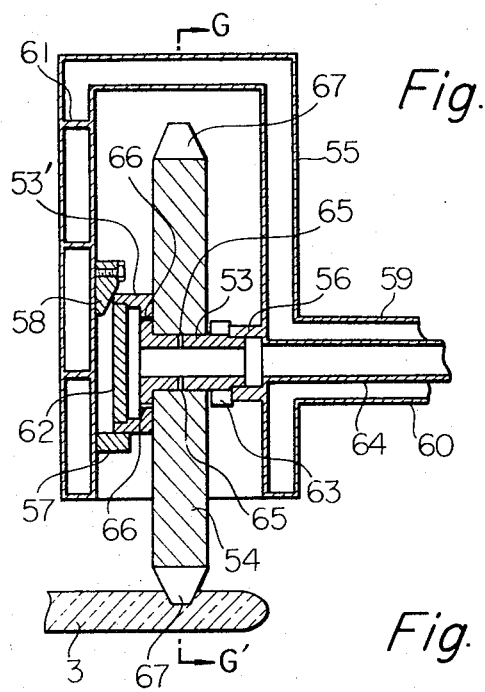
Figure 13:
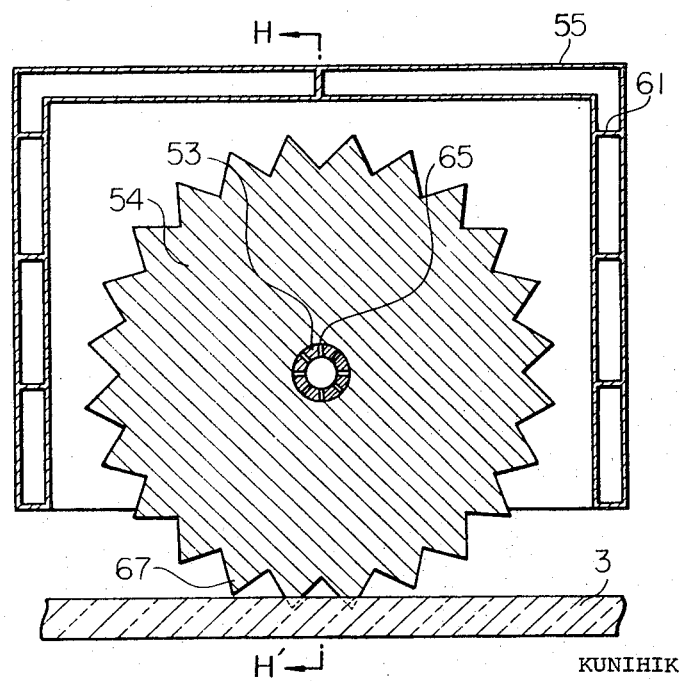

FIGS. 12 and 13 illustrate still another example of the width-controlling mechanism of the apparatus of this invention, FIG. 12 being a section taken along the line H – H' of FIG. 13 and FIG. 13 being a section taken along the line G – G' of FIG. 12.

Figure 14:
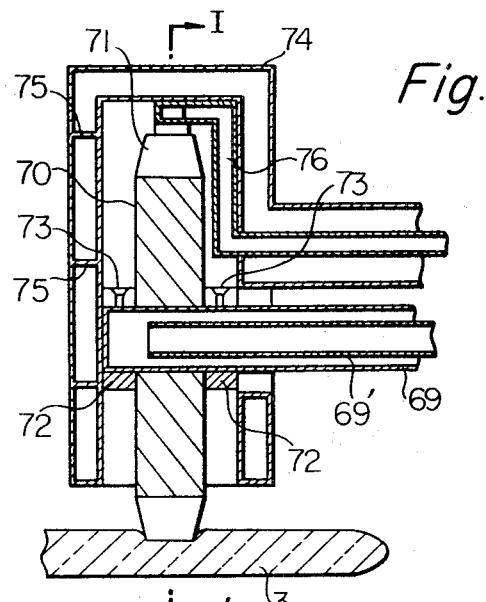
Figure 15:
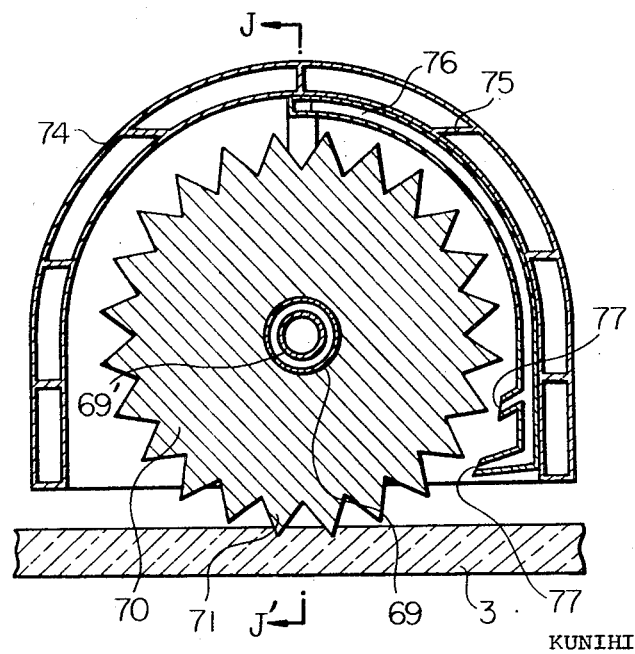

FIGS. 14 and 15 illustrate still another example of the width-controlling mechanism of the apparatus of this invention, FIG. 14 being a section taken along the line J – J' of FIG. 15 and FIG. 15 being a section taken along the line I – I' of FIG. 14.

Figure 18B:
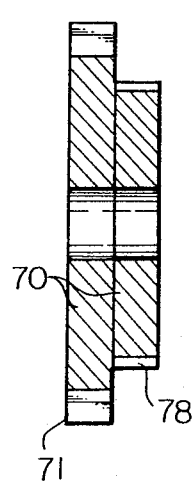
Figure 18A:
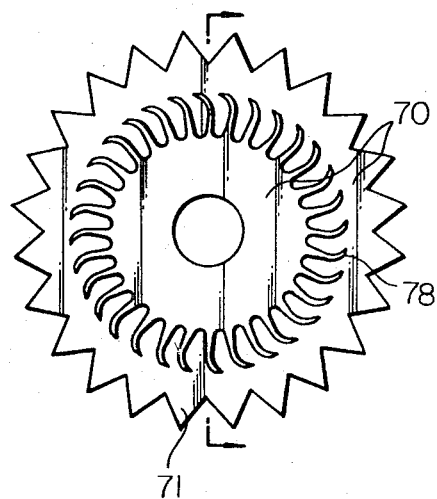
Figures 19B, 19C:
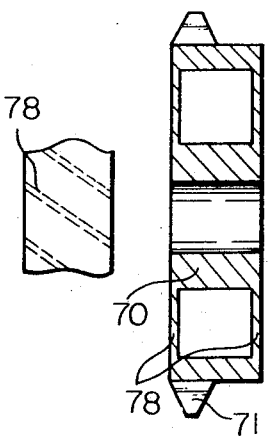
Figure 19A:
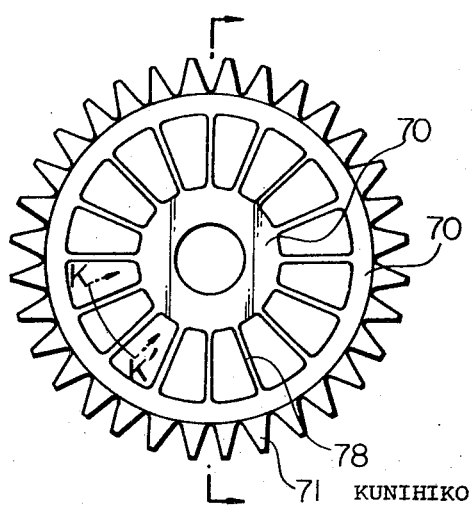

FIGS. 16a, 16b, 17a, 17b, 18a, 18b, 19a, 19b and 19c show examples of the rotary member to be mounted on the apparatus of this invention, each of the respective figures designated a being an elevation view and each of the respective figures designated b being a section along the line b–b of the figure designated a. FIG. 19c is a section taken along the line K – K' of FIG. 19 a.

Referring now to FIGS. 1 and 2, the molten metal bath includes a first zone 1a where a molten glass fed at a prescribed rate is forwarded in the form of a ribbon having almost equilibrium thickness and a certain width; a second zone 1b where the glass ribbon is cooled to such an extent that it may be gripped by pairs of upper and lower rolls and the cooled glass ribbon is gripped at both side edges thereof by pairs of upper and lower driven rolls; a third zone 1c where the cooled glass ribbon is heated again until it is plasticized and the glass ribbon is stretched in both the lateral and longitudinal directions whereby the thickness of the glass ribbon is reduced; and a fourth zone 1d where the glass ribbon of a reduced thickness is cooled sufficiently that it may be taken out of the bath by means of conveying rolls without any damage being imparted to the glass ribbon.

Molten glass which has been melted in a melting furnace (not shown) is poured onto the zone 1a of the molten metal bath through a glass inlet 2 at a prescribed rate and spreads naturally over the zone 1a of the bath to form a glass ribbon 3a having almost equilibrium thickness and certain width, which floats on the surface of the zone 1a toward the zone 1b of the molten metal bath.

In the second zone 1b of the molten metal bath, the glass ribbon 3b is cooled by a cooler 9 provided above the glass ribbon and spaced therefrom and is then gripped at both side edges by pairs of rolls 4a, 4b and 4a', 4b', respectively. The rolls 4a, 4b and 4a', 4b' are driven by motors 5 and 5', whose rotation rate is adjusted by a speed regulator (not shown).

The glass ribbon forwarded to the third zone 1c of the bath of molten metal is heated again by a heater 10 mounted on the roof of the molten metal bath in a manner such that the temperature distribution with respect to the lateral direction is as uniform as possible and the glass ribbon is plasticized. Width-controlling mechanisms, each of which comprises as shaft member 6a (or 6b) and a rotary member 7a (or 7b) and which is capable of rotating freely around the shaft member and which is provided with a plurality of projections 11 on the periphery thereof, are disposed above both side edges of the glass ribbon 3c. Details of the width-controlling mechanism will be described hereinafter by referring to FIGS. 3 and 4. The rotary members 7a and 7b are pressed against the surface of the glass ribbon 3c and allowed to rotate thereon with the advance of the glass ribbon in a manner such that projections 11 stick in the surface portion of the glass ribbon to some extent. The structure of the rotary member will be described hereinafter. The shaft members 6a and 6b may be fixed at an optional length and angle by means of supporting members 12a and 12b.

Every two neighboring zones of the bath of molten metal are separated from each other at the part of the atmosphere above the glass ribbon by a partition wall 13.

The structure of the rotary member will now be described in detail by referring to FIGS. 3 and 4.

Figure 3:
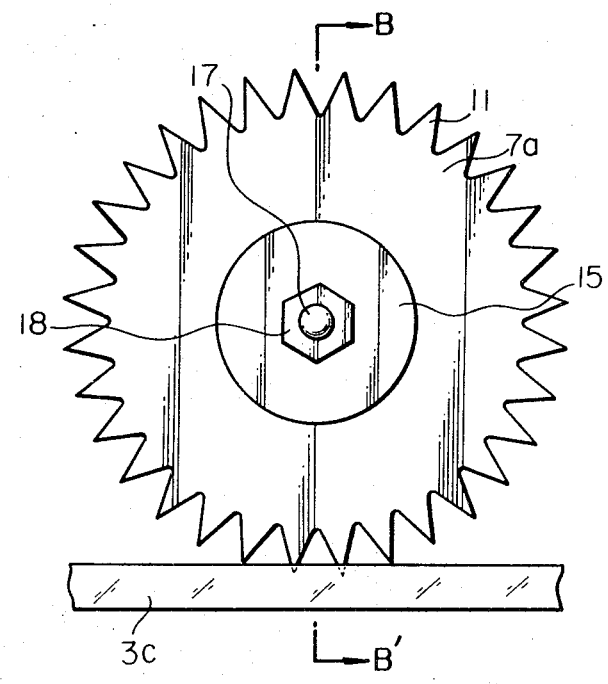
FIG. 3 is a view illustrating the side of one example of the width-controlling mechanism to be provided in the apparatus of this invention.
Figure 4:
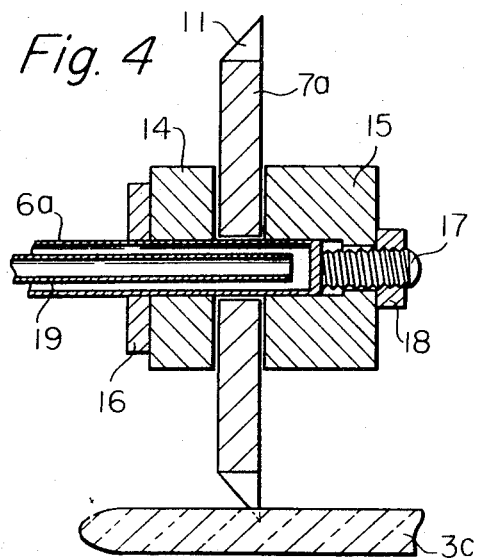
FIG. 4 is a section taken along the line B – B' of FIG. 3.

In FIGS. 3 and 4, a rotary member 7a is composed of carbon and rotates freely and slidably around a shaft member 6a. Fixing rings 14 and 15 composed of carbon are provided to prevent the rotary member 7a from shifting in the axial direction and ensure a smooth rotation of the rotary member 7a. The fixing ring 14 is fixed by an end collar 16 welded to the shaft member 6a, and the fixing member 15 is fixed by a screw 17 welded to the shaft member 6a and a nut 18 engaging the screw 17. Projections 11 are formed radially on the periphery of the rotary member 7a, by which the slippage of the rotary member on the surface of the glass ribbon 3c can be prevented. With a view to smoothing the rotation of the rotary member 7a it is desirable to make the ratio of the diameter of the rotary member 7a to the diameter of the shaft member 6a as great as possible within an allowable range. In this embodiment, the said ratio is about 10 : 1. The shaft member 6a has a double-tubular structure. Cooling water is fed through an inner tube 19 and is discharged into the space formed between the two tubes through which it flows away from the rotary member 7a.

Even if rotary members 7a and 7b are not provided, the glass ribbon 3c may be stretched in the direction of the advance to reduce the thickness thereof, by differentiating the speeds of driven rolls 4a, 4b, 4a' and 4b', and the conveying roll 8. However, in such case, the width of the glass ribbon 3c is also reduced almost in proportion to the reduction of the thickness, with the result that the producibility is greatly lowered. Further, in such case, since the glass ribbon is abruptly stretched, so-called distortions of the glass ribbon and non-uniform thickness in the lateral direction tend to appear. In the above-mentioned embodiment of this invention, rotary members 7a and 7b are disposed in the third zone 1c of the bath of molten metal and allowed to rotate with the advance of the glass ribbon 3c by a component force of each of the rotary members 7a and 7b in the rotation direction, and the glass ribbon 3c is stretched in the lateral direction in the vicinity of the rotary members 7a and 7b by means of projections 11 provided on the peripheries of the rotary members 7a and 7b. At the same time, the glass ribbon 3c is stretched in the direction of the advance by means of the conveying roll 8. Thus there can be produced a glass ribbon of less than equilibrium thickness in which the thickness is uniform and the width is sufficient.

In the embodiment illustrated in FIGS. 1 – 4, five rotary members 7a ( or 7b) are provided in a series along the direction of the advance of the glass ribbon on each side edge of the glass ribbon 3c in a manner such that an angle θ of the line formed by the intersection of a plane perpendicular to the axis of the rotary member and the surface of the glass ribbon with respect to the direction of the advance of the glass ribbon is be about 15° outwardly with respect to the lateral direction. The thickness of the glass ribbon obtained by employing the apparatus shown in the above embodiment is about 2 mm, but the thickness can be reduced to about 1 mm if the angle of the rotary member 7a ( or 7b) and the speed of the conveying roll 8 are varied suitably. Portions of the glass ribbon damaged by the sticking of projections 11 are cut off and are done away with as cullet. Thus the product sheet glass is free of any fault owing to the sticking of projections 11.

Another embodiment of the apparatus of this invention will now be described with reference to FIG. 5.

Molten glass which has been melted in a melting furnace (not shown) is poured onto a bath 21 of molten metal through a glass inlet 20 to form a glass ribbon 22, which is then pulled by a conveying roll 23 and allowed to advance on the bath 21. In the portion of the bath 21 near to the melting furnace (the left side in FIG. 5) the glass ribbon 22 is still in the flowable state and is hardly affected by the pulling of the conveying roll 23. However, as the glass ribbon 22 is gradually cooled during its advance on the bath 21, the glass ribbon 22 starts to undergo the pulling action of the conveying roll 23, whereby not only the thickness but also the width of the glass ribbon 22 is reduced. Rotary members 7a and 7b such as those described in detail hereinabove are provided above each side edge of the glass ribbon 22 at the portion where the width of the glass ribbon is to be reduced, in a manner such that projections 11 provided on the periphery of the rotary members may stick in the surface portion of the glass ribbon to some extent.

Figure 5:
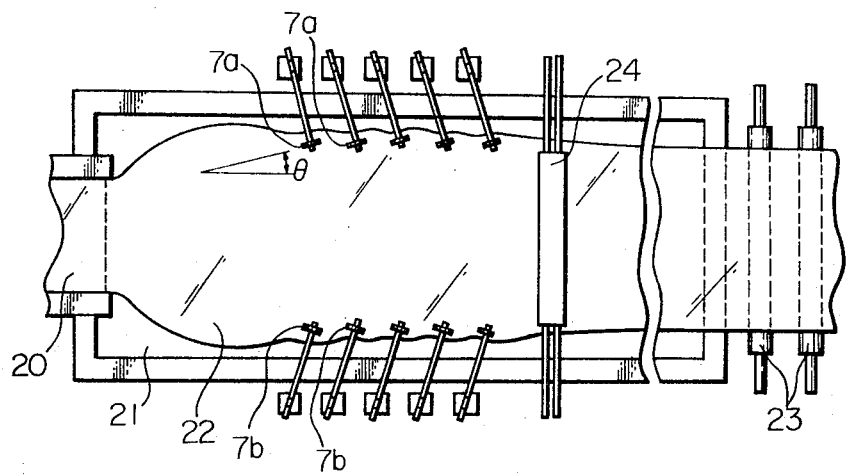
FIGS. 5 and 6 are plan views of further embodiments of the apparatus of this invention, in which the roof structure of the molten metal bath is omitted.

In the embodiment shown in FIG. 5, five width-controlling mechanisms, each comprising the rotary member 7a or 7b, are disposed in a series along the direction of the advance of the glass ribbon on each side edge of the glass ribbon 22. The angle θ of the line formed by the intersection of a plane perpendicular to the axis of the rotary member 7a (or 7b) and the surface of the glass ribbon 22 with respect to the direction of the advance of the glass ribbon 22 is about 22° outwardly with respect to the lateral direction of the glass ribbon 22. Thus the width of the glass ribbon 22 is expanded.

The resulting glass ribbon 22 having a certain thickness and width is cooled by a cooler disposed above the glass ribbon. In this embodiment, as in the embodiment described above in connection with FIGS. 1 – 4, the glass ribbon is gradually stretched in both the lateral direction and the longitudinal direction, and there can be obtained a glass ribbon product of less than equilibrium thickness, in which the thickness is uniform and the width is sufficient. The thickness of the glass ribbon obtained by employing the apparatus of this embodiment is about 2 mm.

Still another embodiment of the apparatus of this invention will now be explained by referring to FIG. 6.

Molten glass which has been melted in a glass melting furnace (not shown) is poured onto a bath 26 of molten metal through a glass inlet 25 and is allowed to advance over the bath 26 in the form of a glass ribbon 27, which is then taken out of the bath 26 by means of a conveying roll 28. On each side edge of the glass ribbon 27, rotary members 7a and 7b such as those described in detail hereinabove are provided along the length of the glass ribbon 27 extending from the point where the glass begins to freely expand on the surface of the bath 26 to the point where the glass becomes plasticized. The provision of rotary members 7a and 7b is effected in a manner such that projections 11 formed on the peripheries of rotary members 7a and 7b may stick into the surface portion of the glass ribbon 27 to some extent. In this embodiment, since the glass ribbon the width of which is ready to expand freely is contracted unforcedly by rotary members 7a and 7b, adhesion of the side edge portion of the glass ribbon 27 to a side wall 29 of the bath 26 of molten metal can be completely prevented. In accordance with the above embodiment, it is possible to produce a glass ribbon having a thickness greater than the equilibrium thickness and uniform in either the longitudinal direction or the lateral direction.

Figure 6:
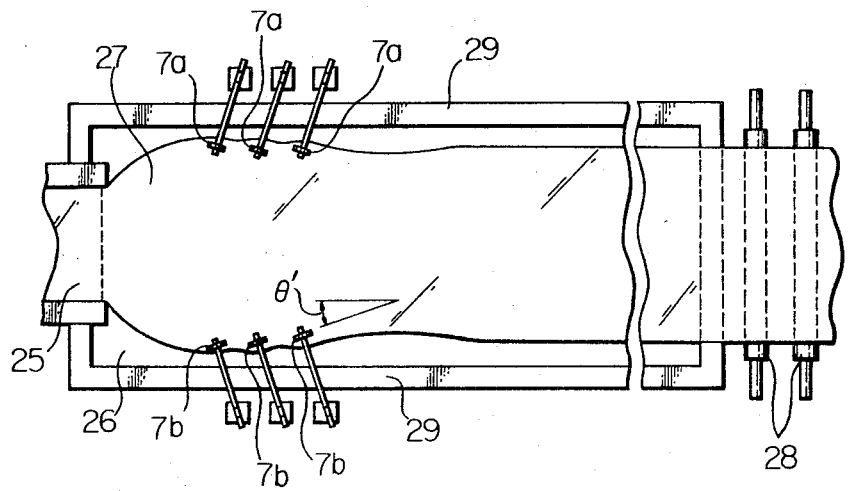

In the embodiment shown in FIG. 6, three width-controlling mechanisms, each comprising a rotary member 7a or 7b, are disposed on each side edge of the glass ribbon 27, and the angle θ of the line formed by the intersection of a plane perpendicular to the axis of the rotary member 7a or 7b and the surface of the glass ribbon with respect to the direction of the advance of the glass ribbon 27 is about 20° inwardly with respect to the lateral direction of the glass ribbon. Thus the glass ribbon which is ready to expand in the lateral direction is contracted by such width-controlling mechanisms. The thickness of the glass ribbon obtained by the apparatus shown in this embodiment is about 12 mm, but it is also possible to produce a glass ribbon having a thickness ranging from the equilibrium thickness to about 15 mm in this embodiment by varying suitably the angle and number of the rotary members 7a and 7b and the amount of molten glass fed to the bath 26 of molten metal.

Several examples of the width-controlling mechanism applicable to the apparatus of this invention will now be described in detail referring to FIGS. 7 – 19.

Figure 7:
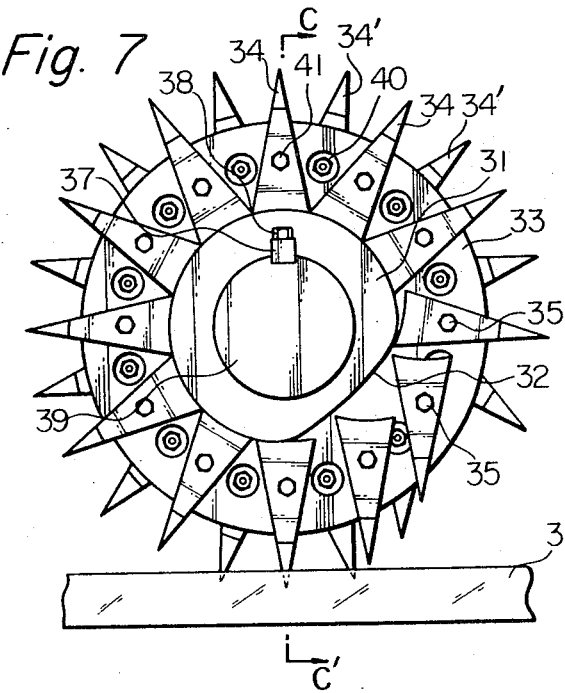
FIG. 7 is a view illustrating the side of another example of the width-controlling mechanism according to this invention.
Figure 8:
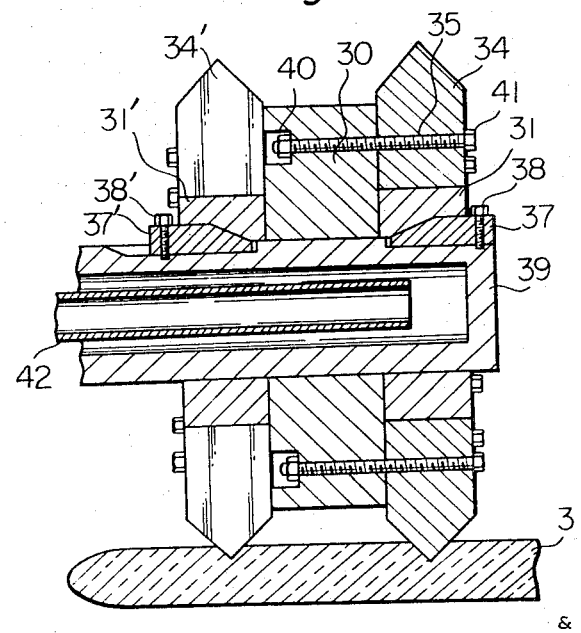
FIG. 8 is a section taken along the line C – C' of FIG. 7.

Referring now to FIGS. 7 and 8, cylindrical cams 31,31' having a notched part 32 are fixed to a fixed shaft by means of keys 37,37' and bolts 38,38'. A rotary plate 33 is disposed such that it may rotate freely around the fixed shaft 39, and it is preferable that the rotary plate 33 be composed of carbon, because a smooth rotation of the plate 33 is ensured without resistance by the self-lubricating action thereof even when used at high temperature zones. Members 34,34' are journalled radially on a shaft 35 on the rotary plate 33 by means of a bolt 41 and a nut 40. Members 34,34' move slidably around the cylindrical portion of the cam 31' and rotate together with the rotary plate 33, but at the notched part of cams 31,31' they are free from the contact with cams 31,31' and rotate freely around the shaft 35. Members 34,34' are disposed in two staggered rows on both sides of the rotary plate 33 in a manner such that two or more of members 34,34' may always stick into the glass ribbon in the plasticized state. When this roll assembly is used at high temperatures, the shaft 39 is constructed to have a double-tubular structure and cooling water is fed through an inner tube 42 and discharged from the space formed between the two tubes. In this example of the width-controlling mechanism, the rotary plate 33 is provided so that it may freely rotate, and the glass ribbon 3 in the plasticized state can be secured firmly by members 34,34' and the glass ribbon undergoes hardly any rotating force when members 34,34' depart from the glass ribbon 3. Thus the detachment of members 34,34' from the glass ribbon 3 can be accomplished very smoothly.

The structures of a rotary member and the cooling box disposed so as to cover the upper portion of the rotary member will now be described in detail referring to FIGS. 9 – 11.

A rotary member 45 is provided in a manner such that it will be able to rotate freely around a fixed shaft 44. The fixed shaft 44 has a double-tubular structure in which cooling water is fed through an inner tube 44' and discharged from the space formed between the two tubes. On the periphery of the rotary member 45 there are formed a plurality of projections 46 to prevent the rotary member 45 from slipping on the surface of the glass ribbon 3 and to ensure the smooth rotation of the rotary member 45. A side collar 47 is fixed on the fixed shaft 44 by means of a screw member 48 so as to prevent the rotary member 45 from shifting in the axial direction.

A cooling box 49 is disposed so as to cover the upper portion of the rotary member 45, and has hollow walls, and an angular tube 50 is connected to the hollow walls to feed and discharge cooling water. The inside of the tube 50 is divided into two portions, cooling water being fed through one portion and discharged through the other. Baffle boards 51 are provided inside the hollow interior of the walls of the cooling box 49 so as to circulate cooling water throughout the inside of the hollow walls of the cooling box in the direction indicated by arrows in the drawings. Cooling water fed to the cooling box 49 is radially directed to the peripheral portion of the cooling box 49 in the left-side portion in FIG. 10, allowed to flow from the right to the left in FIG. 11, and then gathered to the center of the cooling box 49 from the right-side portion in FIG. 10, and is then discharged through the tube 50.

In the conventional apparatus where the width-controlling means is cooled only from the shaft portion thereof, the temperature of the peripheral portion of the rotary member rises and adhesion of the rotary member to the glass ribbon is caused to occur, with the results that the application range of the apparatus is considerably limited. However, in the above-mentioned embodiment of this invention, since radiant heat from the roof of the bath of molten metal and other parts can be blocked out by covering substantially all the upper and side portions of the rotary member 45 with the cooling box of the above-described structure, the rotary member 45 does not adhere to the glass ribbon 3 even at relatively high temperature areas of the bath of molten metal. Accordingly, it is possible to stretch or contract the glass ribbon very efficiently even at relatively high temperature areas of the molten metal bath.

In the above embodiment it is permissible to omit the water-cooling of the shaft member depending on the temperature of the molten metal bath at the point where the width-controlling mechanism is provided. In such case, since it is possible to lessen the diameter of the shaft member, the frictional resistance given to the rotary member rotating freely around the shaft member can be greatly reduced.

In the embodiment shown in FIGS. 12 and 13, a rotary member 54 is mounted in a manner such that it may rotate freely around a hollow shaft member 53, and the rotary member 54, exclusive of its lower portion, and the whole of the hollow shaft member 53 are covered with a hollow walled water-cooling box 55. The diameter of the fixed shaft 53 is made greater at one end 53' thereof with a view to preventing the rotary member from shifting in the axial direction, and the end face of the greater diameter end of the shaft 53 is closed by a cover 62. At the other end of the shaft 53 there is provided a collar 63. The end of the fixed shaft 53 on the side where the collar 63 is mounted is inserted into a socket 56 provided in the water-cooling box 55, and the other end 53' is placed on a support 57 mounted inside the water-cooling box 55 and fixed thereto by means of a stopper 58 of the key type. Cooling water is fed to the cooling box 55 through a tube 59 and discharged from a tube 60. The inside of the hollow walls of the cooling box 55 is partitioned by baffle boards 61 so that cooling water will be circulated throughout the inside of the cooling box 55. A gas is introduced into the hollow portion of the fixed shaft 53 from a gas introducing tube 64 disposed between tubes 59 and 60 through the socket 56, and is then projected from holes 65 extending radially through the fixed shaft member 53 and holes formed on the end 53' of the fixed shaft 53. The introduction of the gas is conducted with a view to preventing oxidation of molten metal contained in the molten metal bath. Accordingly, it is required that the gas should be a non-oxidizing gas.

In this embodiment, the glass ribbon is stretched laterally by means of the rotary member 54 and the rotary member 54 undergoes a force directed inwardly, namely a force directed to the left in FIG. 12. Accordingly, if the collar 63 is provided in a manner such that a suitable space is formed between the collar 63 and rotary member 54, they do not contact each other at all, with the result that it is unnecessary to form a thin layer of the gas between these members by projection of the gas.

Portions of the fixed shaft member 53 and rotary member 54 where they face each other may be composed of a metal or a refractory material. It is particularly preferable that said portions be composed of carbon having a self-lubricating property.

Holes 65 and 66 for projecting a gas can extend through the fixed shaft 53 as in the above embodiment, but it is also possible to constitute the fixed shaft member of a porous material and project the gas from the whole surface confronting the rotary member 54.

In the width-controlling mechanism shown in the above embodiment, a plurality of radial projections 67 are formed on the periphery of the rotary member 54 in a manner such that they may stick into the glass ribbon to some extent. Thus the smooth rotation of the rotary member 54 can be ensured. The gas projected from holes 65 and 66 forms a thin film between the confronting surfaces of the fixed shaft 53 and the rotary member 54, whereby the rotation resistance given to the rotary member is greatly reduced. For instance, at the high temperature zone of the bath of molten metal where the pulling force of the glass ribbon 3 is very low, the rotary member is allowed to rotate smoothly with the advance of the glass ribbon 3 and thus the glass ribbon 3 is stretched laterally by the rotation of the rotary member. Accordingly, in this embodiment there can be obtained in a stable manner a glass ribbon product having a thickness less than the equilibrium thickness and uniform with respect to the lateral direction.

In manufacturing glass ribbon by using the width-controlling mechanism illustrated in the above embodiment, it is possible to stretch or contract the width of the glass ribbon or regulate the position of stretching or contraction, by varying the angle formed by the rotation direction of the rotary member and the direction of advance of the glass ribbon, the position at which the width-controlling mechanism is located and the number of rotary members.

Another modification of the width-controlling mechanism applicable to the apparatus of this invention will now be described with reference to FIGS. 14 and 15.

A fixed shaft member 69 has a double-tubular structure, and cooling water is fed through an inner tube 69' of the shaft member 69 and is discharged from the space formed between the two tubes. A rotary member 70 is mounted on the shaft member 69 in a manner such that the rotary member 70 may rotate freely around the fixed shaft member 69. On the periphery of the rotary member 70 there are formed a plurality of projections 71. A side collar 72 is fitted on the fixed shaft member 69 by means of a screw 73 so as to prevent the rotary member from shifting in the axial direction.

The width-controlling mechanism of this embodiment is used at relatively high temperature areas of the bath of molten metal. Accordingly, the rotary member 70 is covered with a hollow walled water-cooling jacket 74 so as to protect against radiant heat reflecting mainly from the roof portion of the molten metal bath. Passages are constructed inside the water-cooling jacket 74 by arranging baffle boards 74 inside the hollow interior of jacket 74 so that cooling water may run throughout the inside of the jacket 74. One end of a pipe 76 positioned between the water-cooling jacket 74 and the rotary member 70 is connected below the rotary member 70 with a nozzle 77 positioned to face the projections 77 and the other end is connected with a gas-supplying device (not shown) disposed outside the molten metal bath tank.

The pressure and flow rate of the gas to be projected from the nozzle 77 may be varied depending on the rotation resistance between the fixed shaft member 69 and the rotary member 70, the configuration of the projection 71 and the shape of the nozzle 77, but in the width-controlling mechanism of this embodiment, the rotary member 70 is allowed to rotate at a peripheral speed quite similar to the traveling speed of the glass ribbon 3 when the gas is projected toward the projections 71 from the nozzle 77 at a flow rate of about 5 m$^3$/hr under pressure of 1 kg/cm$^2$. When the rotary member 70 is allowed to rotate with the advance of the glass ribbon 3 by letting the projections 71 stick into the surface portions of the glass ribbon 3 to some extent, the resistance between the rotary member 70 and side collar 72 and the resistance between the rotary member 70 and fixed shaft member 69 are increased as compared with the case where such projections are not permitted to stick into the glass ribbon. Accordingly, if such increase of resistances caused by sticking of projections 71 is corrected beforehand, the rotation resistance given to the rotary member can be adjusted to substantially zero. Accordingly, even when the pulling force of the glass ribbon is very low as at high temperature areas of the molten metal bath, the rotary member 70 can rotate very smoothly to thereby stretch the glass ribbon 3 in the lateral direction. Accordingly, in this embodiment it is possible to produce a glass ribbon product having a thickness less than the equilibrium thickness and uniform with respect to the lateral direction thereof. A constant rotation torque approximately corresponding to the rotation resistance given to the rotary member can be easily obtained by projecting the gas toward the projections 71 of the rotary member 70. Further, since the rotation of the rotary member 70 is attained by the advance of the glass ribbon 3, it is unnecessary to strictly regulate the pressure and flow rate of the gas to be projected from the nozzle 77. Accordingly, when a plurality of the width-controlling mechanisms are provided in a series along the direction of the travel of the glass ribbon, the apparatus of this invention does not necessitate a complicated speed control mechanism at all.

In this embodiment, if the rotation torque is made greater than the rotation resistance given to the rotary member 70 by suitably adjusting conditions for projecting the gas from the nozzle 71, the effect of stretching the width of the glass ribbon 3 can be further heightened.

When the gas is projected in such direction and at such position as described with respect to the above embodiment, adiabatic expansion is caused to occur in the gas when it contacts the projections 71 and the temperature of the gas is lowered, with the result that the temperature of the projections 71 and the surface temperature of the glass ribbon just before the contact with the projections 71 can also be lowered. Accordingly, even at high temperature zones of the molten metal bath where the projections 71 would inevitably adhere to the glass ribbon 3 under ordinary conditions, such adhesion can be prevented in the apparatus of this invention.

Figure 16B:
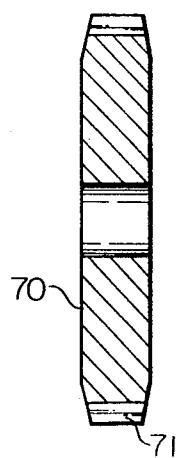
Figure 16A:
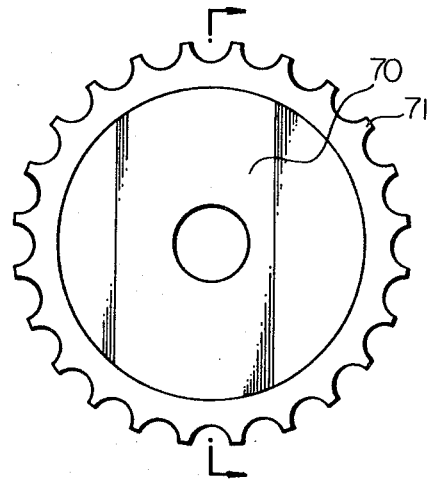
Figure 17B:
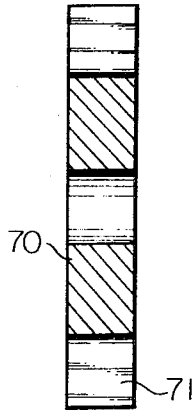
Figure 17A:
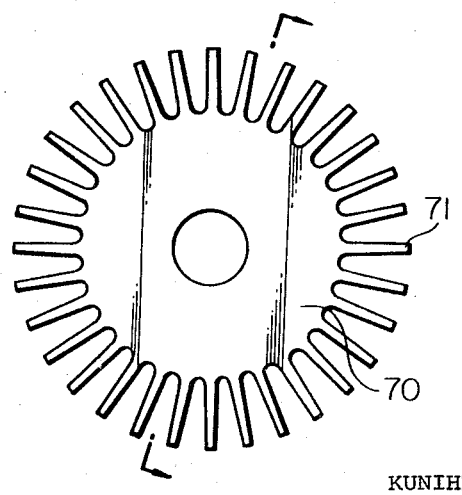

In this invention the rotation of the rotary member can be promoted by projecting the gas directly to the projections but it is also possible to provide vanes independently of the projections on the periphery of the rotary member and to project the gas to such vanes, thus promoting the rotation of the rotary member. Examples of the rotary member 70 of the former type are illustrated in FIGS. 16a, b and 17a, b, and examples of the rotary member 70 of the latter type are shown in FIGS. 18a, b and 19a, b, c. In FIGS. 16 – 19, the projections for sticking into the surface portion of the glass ribbon 3 and controlling the width of the glass ribbon are indicated by reference number 71 and the vanes for promoting the rotation of the rotary member are designated by reference number 78.

What we claim is:

1. In an apparatus for manufacturing glass ribbon by the float process which has a bath of a molten metal for supporting molten glass ribbon fed from a molten glass inlet and forwarding it while cooling it, and a delivery roll provided on the exit end of the molten metal bath to convey the glass ribbon out of the bath, the improvement comprising at least two width-controlling mechanisms on both side edges of the molten metal bath and spaced along the direction of travel of the glass ribbon and positioned only above the upper surface of the glass ribbon, each width controlling mechanism having a shaft member and a rotary member provided on said shaft member, said rotary member having on the periphery thereof a plurality of projections engaging the side edges of the glass ribbon, the rotary member of each width-controlling mechanism being freely rotatably supported so that the rotary member rotates with the advance of the glass ribbon, and the line formed by the intersection of a plane perpendicular to the axis of the rotary member and the surface of the glass ribbon has an angle of less than $45_0$ with respect to the direction of the advance of the glass ribbon.

2. The improvement as claimed in claim 1 wherein each of said width-controlling mechanisms comprises a shaft member, a cylindrical cam fixed to the shaft member and having a notched portion on a part of the periphery thereof and a rotary member, said rotary member being a rotary plate rotatably mounted on the shaft member, and a plurality of projections pivotally mounted on said rotary plate, said projections having the bases thereof slidable on the circular periphery of said cam and sticking into the surface portion of the glass ribbon when the glass is in the plasticized state, said notched portion being positioned on a part of the periphery of said cam such that when said projections are sticking into the surface portion of the glass ribbon, said projections slide on the circular periphery of said cam and rotate around said shaft member together with said rotary plate, and when said projections are going to separate from the surface portion of the glass ribbon, the bases reach said notched portion said projections are allowed to rotate freely around the pivotal mounting points.

3. The improvement as claimed in claim 1 each of said width-controlling mechanisms further comprises a cooling box over the upper portions of the rotary member and at least partially over the sides thereof, said cooling box having hollow walls and an inlet and an outlet to the hollow within the walls for introducing and discharging a cooling fluid and having means in the hollow within the walls for circulating the cooling fluid throughout the walls of said cooling box.

4. The improvement as claimed in claim 1 wherein the rotary member is fixed to the shaft member and a supporting member is provided supporting the shaft member so that the shaft member can rotate freely.

5. The improvement as claimed in claim 1 wherein the shaft member is fixed and the rotary member is freely rotatably mounted on the shaft member.

6. The improvement as claimed in claim 1 wherein the rotary member is composed of a refractory material non-wettable to molten glass and is provided with saw-tooth-like projections around the periphery thereof.

7. The improvement as claimed in claim 6 wherein the tip angle of each of the saw-tooth-like projections is in the range of from 5° to 90° and the pitch and height of each projection are such that one to 10 of said projections may always stick into the surface portion of the molten glass ribbon.

8. The improvement as claimed in claim 5 wherein the said width-controlling mechanism comprises means for forming a thin film of a non-oxidizing gas between the shaft member and the rotary member over at least a part of the area where they face each other.

9. The improvement as claimed in claim 1 wherein the said width-controlling mechanism comprises means for projecting a non-oxidizing fluid onto the rotary member in the same direction as the rotation direction of the rotary member and thereby promoting the free rotation of the rotary member.

10. The improvement as described in claim 1 wherein the line formed by the intersection of a plane perpendicular to the axis of the rotary member and the surface of the glass ribbon has an angle of 5° – 45° with respect to the direction of the advance of the glass ribbon.

11. The improvement as claimed in claim 10 further comprising rotating means connected to the rotary member for rotating said rotary member in the direction for expanding the width of the glass ribbon.

* * * * *